United States Patent
Park et al.

(10) Patent No.: US 10,437,894 B2
(45) Date of Patent: *Oct. 8, 2019

(54) METHOD AND SYSTEM FOR APP SEARCH ENGINE LEVERAGING USER REVIEWS

(71) Applicant: TCL RESEARCH AMERICA INC., San Jose, CA (US)

(72) Inventors: Dae Hoon Park, San Jose, CA (US); Mengwen Liu, San Jose, CA (US); Lifan Guo, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 756 days.

This patent is subject to a terminal disclaimer.

(21) Appl. No.: 14/706,631

(22) Filed: May 7, 2015

(65) Prior Publication Data

US 2016/0328403 A1   Nov. 10, 2016

(51) Int. Cl.
*G06F 7/00* (2006.01)
*G06F 16/951* (2019.01)
*G06F 16/33* (2019.01)
*G06F 11/34* (2006.01)

(52) U.S. Cl.
CPC ........ *G06F 16/951* (2019.01); *G06F 16/3331* (2019.01); *G06F 11/3409* (2013.01)

(58) Field of Classification Search
CPC .................................................. G06F 11/3409
USPC .......................................................... 707/748
See application file for complete search history.

(56) References Cited

U.S. PATENT DOCUMENTS

| 8,713,684 | B2 * | 4/2014 | Bettini | G06F 21/57 726/25 |
| 8,886,517 | B2 * | 11/2014 | Soricut | G06F 17/2854 704/2 |
| 9,396,237 | B1 * | 7/2016 | Shah | G06Q 10/10 |
| 2009/0138898 | A1 * | 5/2009 | Grechanik | G06F 8/20 719/328 |
| 2010/0058168 | A1 * | 3/2010 | Gibb | G06F 16/9535 715/234 |
| 2011/0083167 | A1 * | 4/2011 | Carpenter | H04L 67/10 726/4 |
| 2011/0288941 | A1 * | 11/2011 | Chandra | G06Q 30/02 705/14.73 |

(Continued)

OTHER PUBLICATIONS

Mar'ia G'omez, Romain Rouvoy, Martin Monperrus and Lionel Seinturier "A Recommender System of Buggy App Checkers for App Store Moderators" University Lille 1 / Inria.

*Primary Examiner* — Eliyah S. Harper
(74) *Attorney, Agent, or Firm* — Anova Law Group, PLLC

(57) ABSTRACT

A method for an app search engine leveraging user reviews is provided. The method includes receiving an app search query from a user, determining a plurality of relevant apps based on the received app search query, and extracting app descriptions and user reviews associated with the plurality of relevant apps from an app database. The method also includes preprocessing the extracted app descriptions and user reviews of each of the plurality of relevant apps to generate a text corpus and creating a topic-based language model for each of the plurality of relevant apps based on the generated text corpus. Further, the method includes ranking a list of relevant apps using the topic-based language model and providing the ranked app list for the user.

10 Claims, 6 Drawing Sheets

(56) References Cited

U.S. PATENT DOCUMENTS

| | | | | |
|---|---|---|---|---|
| 2012/0124061 A1* | 5/2012 | Macbeth | G06F 9/445 | 707/749 |
| 2012/0240236 A1* | 9/2012 | Wyatt | G06F 21/564 | 726/25 |
| 2013/0191397 A1* | 7/2013 | Avadhanam | G06F 16/24578 | 707/748 |
| 2013/0325856 A1* | 12/2013 | Soto Matamala | G06F 17/3089 | 707/724 |
| 2014/0088392 A1* | 3/2014 | Bernstein | G06F 19/3418 | 600/365 |
| 2014/0201655 A1* | 7/2014 | Mahaffey | G06F 3/04817 | 715/765 |
| 2014/0201681 A1* | 7/2014 | Mahaffey | H04M 1/72569 | 715/846 |
| 2014/0214898 A1* | 7/2014 | Shapira | H04L 67/02 | 707/771 |
| 2014/0280098 A1* | 9/2014 | Glover | G06F 16/9535 | 707/723 |
| 2015/0244829 A1* | 8/2015 | Ethington | G06F 16/24578 | 715/753 |

\* cited by examiner

METHOD AND SYSTEM FOR APP SEARCH ENGINE LEVERAGING USER REVIEWS

FIELD OF THE INVENTION

The present invention generally relates to the field of information technology and user interface technologies and, more particularly, to methods and systems for an app search engine leveraging user reviews.

BACKGROUND

Nowadays, mobile apps have become indispensable parts of modern human life. Currently, average American users spend about three hours (177 minutes) per day on mobile devices, which is more than the average time spent on TV (168 minutes). An analysis in 2013 shows that 80% of time spent on the mobile devices is inside apps (e.g., games, news, productivity, utility, and social networking apps), and only 20% of time on the mobile devices is spent on mobile web, where the time spent on the mobile web remained flat in 2014 while the time spent inside apps increased. While the users spend much of their time inside apps, the users constantly download new mobile apps. Meanwhile, with explosive growth in the number of mobile apps in app stores (e.g., Apple iTunes, Google Play, Windows Phone Store, and BlackBerry App World), a search function in the app stores becomes essential. In July 2014, there are about 1.3 million apps and 1.2 million apps in Google Play app store and Apple App Store, respectively. As the number of apps is huge, it is extremely hard for the users to find apps without search or recommendation functions. For example, instead of listing all the apps, Google Play lists only recommended or popular apps because finding an app through a long list does not make sense any more. Moreover, in an app developer's view, new or unpopular apps are barely discovered by the users if the app stores do not recommend them. Therefore, an app search engine is necessary for both the users and app developers.

The term app or application is "a computer program designed for a specific task or use". In other words, the app is defined by its functions that enable the users to perform specific tasks. In fact, 83% of app searches are made by the app function while 17% are made by an app name. Thus, a goal is to find apps based on the function that is specified by the user. Specifically, given a user query that describes a function, the desired search result can show a ranked list of apps, where the first ranked app are more likely to have the query function. For example, for a functional query "book a flight", a user expects a search result including apps such as "Expedia Hotels & Flights" and "Orbitz—Flights, Hotels, Cars" in the top ten apps of a ranked app list since these apps meet the user's needs. Recommendation systems play an important role in human life, greatly facilitating people's daily lives through providing information to the users. The recommendation systems are generally classified into two major systems: collaborative filtering systems and content-based recommendation systems. The collaborative filtering systems recommend items that other users with similar tastes preferred in the past while the content-based systems generally recommend items similar to those preferred by the user in the past. The recommendation systems are closely related to retrieval systems in that they rank objects to fulfill user's needs.

However, the retrieval systems are different from the recommendation systems mainly because the user explicitly expresses his or her needs in the retrieval systems while the recommendation systems suggest the items based on the user profile without asking for the user's needs. The recommendation systems may be more convenient for the user since the user does not need to input his or her needs, but the items suggested by the recommendation systems are likely to be less accurate than the retrieval systems since the recommendation systems barely know what the user currently needs. In addition, the recommendation systems encounter a cold start problem when the user does not have a profile yet or when the recommendation system does not have enough transaction data yet, while the retrieval systems do not require such data.

The disclosed methods and systems are directed to solve one or more problems set forth above and other problems.

BRIEF SUMMARY OF THE DISCLOSURE

One aspect of the present disclosure includes a method for an app search engine leveraging user reviews. The method includes receiving an app search query from a user, determining a plurality of relevant apps based on the received app search query, and extracting app descriptions and user reviews associated with the plurality of relevant apps from an app database. The method also includes preprocessing the extracted app descriptions and user reviews of each of the plurality of relevant apps to generate a text corpus and creating a topic-based language model for each of the plurality of relevant apps based on the generated text corpus. Further, the method includes ranking a list of relevant apps using the topic-based language model and providing the ranked app list for the user.

Another aspect of the present disclosure includes a system for an app search engine leveraging user reviews. The system includes a receiving module configured to receive an app search query from a user and an extraction module configured to extract app descriptions and user reviews associated with each app name from an app database based on the received app search query. The system also includes a preprocessing module configured to perform preliminary processing for the extracted app descriptions and user reviews of each app to generate a text corpus and a language model creating module configured to create a topic-based language model for each app based on the generated text corpus. Further, the system includes a result ranking module configured to rank a list of apps using the topic-based language model and provide the ranked app list to the user.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
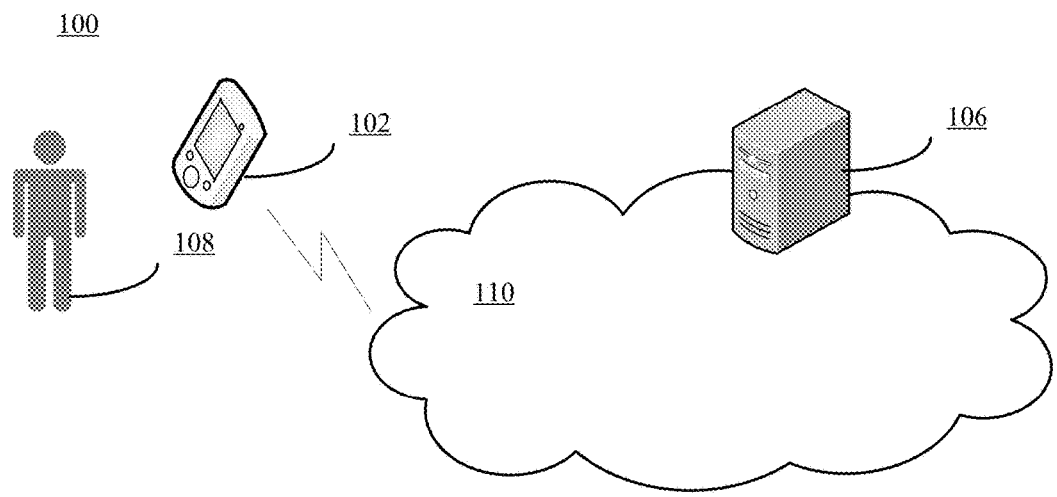
FIG. 1 illustrates an exemplary environment incorporating certain embodiments of the present invention.

FIG. 1 illustrates an exemplary environment 100 incorporating certain embodiments of the present invention. As shown in FIG. 1, environment 100 may include a mobile terminal 102, a server 106, a user 108 and a network 110.

Mobile terminal 102 (also known as the mobile terminal device) may refer to any appropriate user mobile terminal with certain computing capabilities, such as a hand-held computing device (tablet), a smartphone or mobile phone, or any other user-side mobile computing device. Mobile terminal 102 may be implemented on any appropriate mobile computing platform. Mobile terminal 102 may be used by user 108 to connect to network 110 and make requests to server 106. The mobile terminal 102 may obtain information from any appropriate sources, such as from a local storage device, from a wired or wireless network device of a service provider, or from the Internet. The mobile terminal 102 may also be configured to access the functionalities of various applications for varying computing environments. For example, the mobile terminal 102 may be configured to execute apps stored on the mobile terminal 102.

Further, the server 106 may refer to one or more server computers configured to provide certain web server functionalities (e.g., search server). The server 106 may include one or more processors to execute computer programs in parallel. The server 106 may store data (e.g., app names, app descriptions and user reviews) to be access by the mobile terminals and application software (e.g., an app retrieval system).

Mobile terminal 102 and server 106 may communicate with each other through communication network 110, such as a cable network, a phone network, and/or a satellite network, etc. Although one mobile terminal 102 and one server 106 are shown in FIG. 1, any number of mobile terminals and/or servers may be included.

Figure 2:
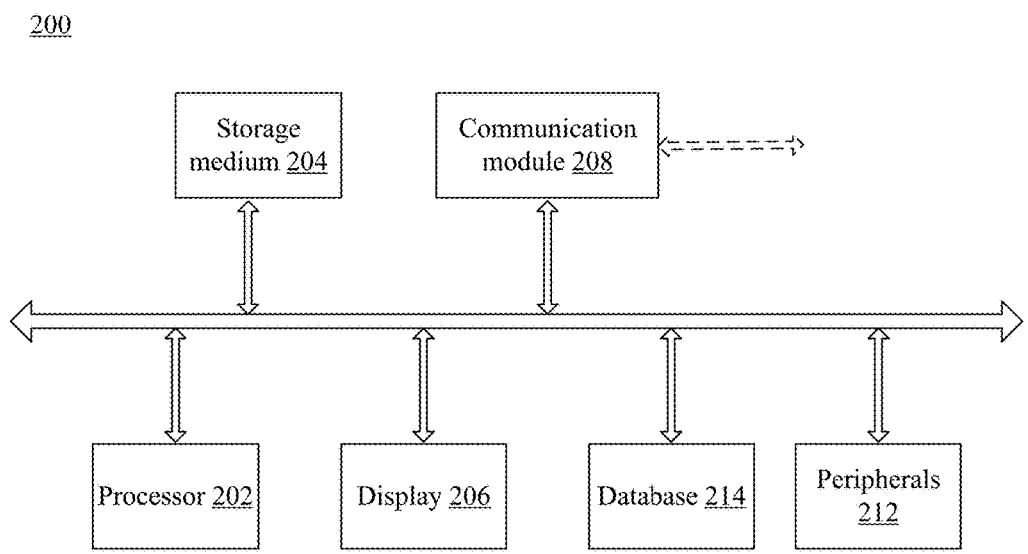
FIG. 2 illustrates an exemplary computing system consistent with the disclosed embodiments.

Mobile terminal 102 and/or server 106 may be implemented on any appropriate computing circuitry platform. FIG. 2 shows a block diagram of an exemplary computing system 200 capable of implementing mobile terminal 102 and/or server 106.

As shown in FIG. 2, computing system 200 may include a processor 202, a storage medium 204, a display 206, a communication module 208, a database 210, and peripherals 212. Certain devices may be omitted and other devices may be included.

Processor 202 may include any appropriate processor or processors. Further, processor 202 can include multiple cores for multi-thread or parallel processing. Storage medium 204 may include memory modules, such as ROM, RAM, flash memory modules, and mass storages, such as CD-ROM and hard disk, etc. Storage medium 204 may store computer programs for implementing various processes, when the computer programs are executed by processor 202.

Further, peripherals 212 may include various sensors and other I/O devices, such as keyboard and mouse, and communication module 208 may include certain network interface devices for establishing connections through communication networks. Database 210 may include one or more databases for storing certain data (e.g., app descriptions and user reviews) and for performing certain operations on the stored data, such as app searching.

Figure 3:
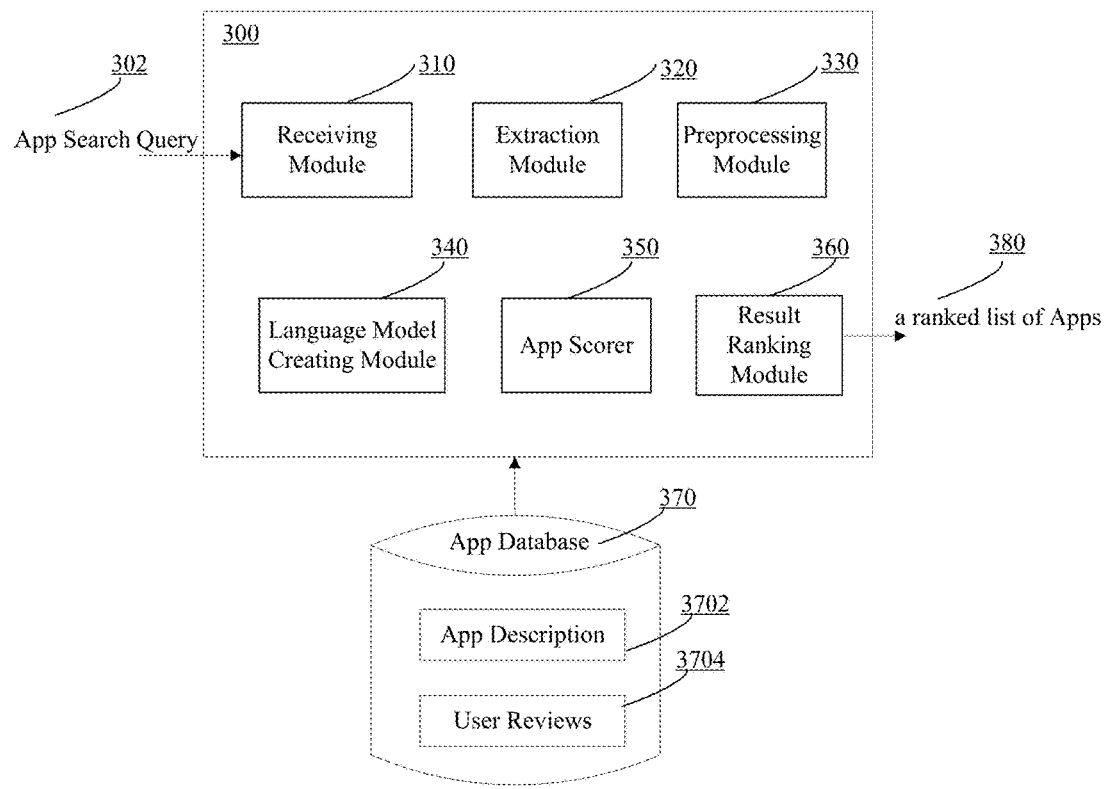
FIG. 3 illustrates an exemplary app retrieval system consistent with the disclosed embodiments.

Mobile terminal 102 may provide requests to server 106 based on at least one user query from the user 108, and server 106 may respond with the received requests. The app retrieval system may use a probabilistic topic model that jointly models user reviews and unstructured product information (product description) in order to obtain representation of apps. FIG. 3 illustrates an exemplary app retrieval system 300 consistent with the disclosed embodiments.

As shown in FIG. 3, the app retrieval system 300 may include a receiving module 310, an extraction module 320, a preprocessing module 330, a language model creating module 340, an app scorer 350, and a result ranking module 360. Certain components may be omitted and other components may be added. Further, an input of the app retrieval system 300 is an app search query 302 from a user, and an output of the app retrieval system 300 is a ranked list of Apps 380. An app database 370 may be configured to store app names, app descriptions 3702 and user reviews 3704 associated with each app name. Each of the modules can be processed by one or more computer systems.

The receiving module 310 may be configured to receive the app search query 302 from the user. This app search query may be one or more keywords explaining a type of app the user is interested in or a keyword of a word that may be a part of an app title or a description that the user is interested in. For example, a user looking for apps involving car may type the keyword "Car" which is sent to the app retrieval system 300 by the user through his/her mobile device. For another example, a user looking for apps involving eating food may type a phrase "Find a restaurant" which is sent to the app retrieval system 300 by the user through his/her mobile device.

The extraction module 320 may be configured to determine a plurality of relevant apps based on the received app search query 302 and extract app descriptions 3702 and user reviews 3704 associated with the plurality of relevant apps name from the app database 370. The extraction module 320 may identify an initial set of apps determined to be potentially relevant to the app search query.

The preprocessing module 330 may be configured to perform preliminary processing for the extracted app descriptions and user reviews of each of the plurality of relevant apps to generate a text corpus. The content of the text corpus is normalized to a canonical form. The text corpus is a large and structured set of texts. The text corpus is used to do statistical analysis, checking occurrences or validating linguistic rules within a specific language territory.

The language model creating module 340 may be configured to, based on the generated text corpus, create a topic-based language model for each of the plurality of relevant apps. That is, the language model creating module 340 may create a unigram language model for combining representations of description d and user review r for each app. The topic-based model captures topics jointly from the user reviews and the descriptions so that the topics reflect vocabulary of both the reviews (users) and the descriptions (developers). The model can filter out noise in the user reviews. Further, the model is unsupervised and general so that the model can be applied to other domains where there are unstructured text about an entity and an associated set of unstructured text.

The app scorer 350 may be configured to score the given query word in each topic associated with each app, and calculate each app score for the given query from the scores of the query words.

The result ranking module 360 may be configured to rank a list of relevant apps that are scored according to the relevance (i.e., each app score for the given query) to the received app search query using the topic-based language model and provide the ranked app list to the user. Based on the scores for the apps, the result ranking module 360 may select a working subset of apps from the initial set of apps. For example, the result ranking module 360 may discard or remove apps that do not meet a threshold score. The user may set the number of apps in the outputted ranked app list. For example, a user may set 50 apps in the ranked app list. This ranked app list may be formatted to be viewable by a mobile device used by the user.

Compared to other resources, data stored in the app database 370 can more directly reflect apps' functions (or features). For example, a row of an app database includes an app ID, an app name, an app developer, an app price, one or more app descriptions from one or more app stores (e.g., Apple iTunes, Google Play, Windows Phone Store, and BlackBerry App World), and one or more user reviews crawled from app review websites.

Figure 4:
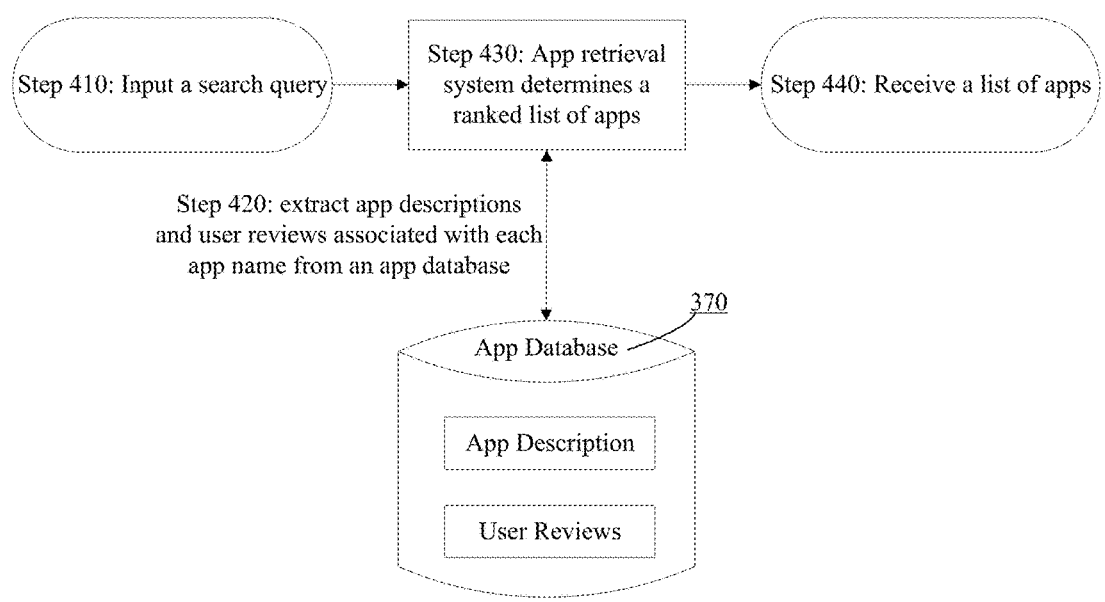
FIG. 4 illustrates an exemplary app search scenario for an app retrieval system consistent with the disclosed embodiments.

In operation, the system 300 may perform certain processes to determine a list of applications or apps. This list of applications may be provided to the user via the network in a form of the ranked app list. This disclosed app retrieval system is flexible to various scenarios regardless of the amount of the user views. FIG. 4 illustrates an exemplary app search scenario for an app retrieval system consistent with the disclosed embodiments.

As shown in FIG. 4, at the beginning, a user u using a mobile device inputs an app search query q into an app retrieval system 300 (Step 410). The user u constructs the app search query q, where q represents the search intent of the user u. Based on the app search query q received from the user, the app retrieval system 300 extracts app descriptions and user reviews associated with relevant apps from an app database (Step 420). The extracted app descriptions and user reviews have relevance to the app search query q. This app search query may be one or more keywords explaining a type of app the user is interested in or a keyword of a word that may be a part of an app title or a description that the user is interested in. For example, a user looking for apps involving car may type the keyword "Car" which is sent to the app retrieval system 300 by the user through his/her device.

The system 300 determines a list of apps that are ranked according to relevance to the received app search query q (Step 430). The app retrieval system 300 searches for relevant apps that satisfy the user's intent by analyzing the extracted app descriptions and user reviews. The system 300 generates a list of relevant apps that are ranked according to the relevance to the app search query q, which conforms to the probability ranking principle in a topic-based language model. Formally, the user is given M apps $A=\{a_1, \ldots, a_M\}$. For each app $a_i$, there is an unstructured app description $d_i$ and the user reviews that are concatenated to a single review document $r_i$. The list of apps for each q is retrieved and outputted based on app descriptions and/or user reviews and rank apps in order of the probability of relevance.

The user receives the ranked app list outputted from the system 300 (Step 440). This ranked app list may be formatted to be viewable by the mobile device used by the user. That is, this ranked app list may be formatted and provided to a user's device so that a user can view and browse the ranked app list. Selection of any of the apps on the ranked app list by the user results in the user being brought to an app launch page associated with that app.

Figure 5:
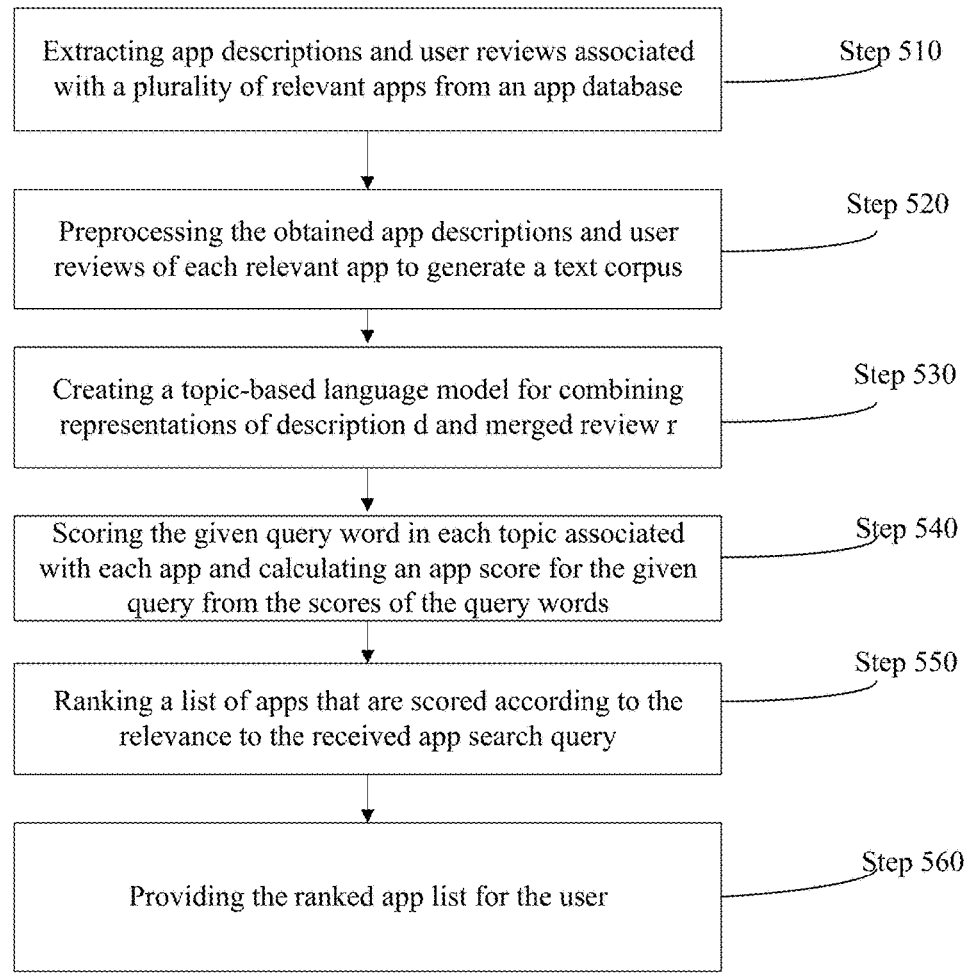
FIG. 5 illustrates a flow chart of an exemplary process for app retrieval consistent with the disclosed embodiments.

FIG. 5 illustrates a flow chart of an exemplary app retrieval process 500 consistent with the disclosed embodiments. As shown in FIG. 5, at the beginning, based on an app search query q received from the user, app descriptions and user reviews associated with a plurality of relevant apps are extracted from an app database (Step 510). An initial set of apps determined to be potentially relevant to the received app search query may be identified based on the received app search query. The app database stores app descriptions and user reviews. For example, a row of an app database includes an app ID, an app name, an app developer, an app price, one or more app descriptions from one or more app stores (e.g., Apple iTunes, Google Play, Windows Phone Store, and BlackBerry App World), and one or more user reviews. This app search query q may be one or more keywords explaining a type of app the user is interested in or a keyword of a word that may be a part of an app title or a description that the user is interested in.

The extracted app descriptions and user reviews of relevant apps are preprocessed to generate a text corpus (Step 520). The text corpus is a large and structured set of texts, including a description d and a merged review r. The text corpus is used to do statistical analysis, checking occurrences or validating linguistic rules within a specific language territory. The content of the text corpus is normalized to a canonical form. Words are grouped or mapped together. In some embodiments, the words are stemmed. For example, "walk", "walking", "walked" and "walks" are mapped together since these words can be reduced into a common form (or root/base word) "walk". based on the received app search query, determining a plurality of relevant apps;

The user reviews are useful extra sources to find apps relevant to the app search query q especially when some descriptions are too short and others may contain too much useless information. If the app description does not contain enough clues for finding the apps, texts in the user reviews can serve as the clues.

Different topics are stressed and different vocabularies are used in the app descriptions and the user reviews, which make the two types of data hard to merge. In addition, the user reviews often contain content that does not address the entity's features. For example, huge portion of user reviews is about installation problems or general sentiment on the whole app. Any content that does not address the entity's features is removed. Thus, the two types of data is needed to be unified.

Due to the nature of apps, the app descriptions are usually written mainly about the features of the app. App developers may not exactly know what terms the users will use to describe the features. For example, an app description may contain a phrase "find nearby restaurants" to describe its feature. If a user who needs the feature searches for "food near me", which does not contain any common terms with the description, the app may not be retrieved by simple keyword matching. The user reviews may play an important role here to bridge vocabulary gap between the app developers and the users since the user reviews are written by the users. If there is a user review containing a phrase such as "food near me" and they are indexed for retrieving apps, the app can be retrieved even though the query does not have common terms with the descriptions.

To exploit user reviews as well as app descriptions, representations of the description d and the merged review r need to be combined. A topic-based language model for combining representations of the description d and the merged review r is created for each app (Step 530).

A unigram language model for descriptions, p(w|d), and reviews, p(w|r), can be linearly interpolated to build a language model for apps, p(w|a), which is defined as:

$$p(w|a) = (1-\mu)p(w|d) + \mu p(w|r) \quad (1)$$

where $\mu$ is a parameter to determine the proportion of review language model in p(w|a).

A score function of a Query Likelihood (QL) method may be employed to score apps. QL scores a document d with respect to q as follows:

$$\text{score}(q, d) = \prod_{w \in q} p(w|d) \quad (2)$$
$$= \prod_{w \in q} (1-\kappa) p_{ml}(w|d) + \kappa p(w|D)$$

where D is a document corpus, and pml(w|d) and p(w|D) are estimated by a Maximum Likelihood Estimator (MLE), which makes $$p_{ml}(w|d) = \frac{c(w, d)}{\sum_{w'} c(w', d)} \text{ and } p(w|D) = \frac{c(w, D)}{\sum_{w'} c(w', D)}.$$

In Formula (2), a Jelinek Mercer smoothing technique with a smoothing parameter $\kappa$ may be applied. p(w|d) and p(w|r) are estimated by the MLE and smoothed as in QL, and the resulting score function for q and a is defined as:

$$\text{score}(q, a) = \prod_{w \in q} p(w|a) \quad (3)$$
$$= \prod_{w \in q} [(1-\mu)p(w|d) + \mu p(w|r)]$$
$$= \prod_{w \in q} [(1-\mu)((1-\kappa_d)p_{ml}(w|d) + \kappa_d p(w|D)) +$$
$$\mu((1-\kappa_r)p_{ml}(w|r) + \kappa_r p(w|R))]$$

where p(w|R) is a background language model in all reviews R, and $\kappa_d$ and $\kappa_r$ are smoothing parameters for app descriptions and user reviews, respectively.

Unlike the app descriptions, the user reviews often contain information that is not about features of an app. Many users leave a review with a short sentence such as "Great app!" or "Works perfect", which does not provide substantial content. Thus, a review language model p(w|r) needs to be built for an app by removing noises in the user reviews. In order to remove useless words in the user reviews, a topic model which bridges vocabulary gap between the app developers and the users may be created. The topic model is trained from the text corpus.

The topic model is a probabilistic model that can find latent themes and their distributions in a document from a text collection, where a theme is a cluster of words whose occurrence in documents overlap frequently. That is, the topic model includes topics which are groups of words that are frequently found together. A list of topics is generated, and probabilities for each topic are established. The topics or groupings of words are able to be composed of general words or more specific words. For example, words in a "computer programming" topic may include "code," "testing," "debugging," and "compile". A list (or other structure) of topics is generated, and probabilities for each topic are established. In general, the description and the user review of each app are composed of several topics. For example, a "Travel" app (e.g., Expedia, Tripadvisor, and Travelocity) may include a "cars" topic, a "Flights" topic and a "Hotels" topic.

In the topic model, a topic represents correlated words. Thus, even if a document d does not contain a certain word w, p(w|d) can be high enough if d contains enough words that are in the same topic as w is. For example, even if a word "bistro" is not contained in an app description for a restaurant finder app, the app could be retrieved if the app description or the user reviews for the app contains a word "restaurant" since the two words are likely to be in the same topic.

The two topic models are Probabilistic Latent Semantic Analysis (PLSA) and Latent Dirichlet Allocation (LDA). PLSA is based on a mixture decomposition derived from a latent class model. LDA is a generative topic model, and it finds latent topics.

LDA is taken as an example. Each topic z is represented by a word distribution $\varphi_z$, and their distributions $\theta_d$ in each document d. Given the number of topics K and M documents, where each document d contains $N_d$ words and the whole document collections build a word vocabulary V. LDA generates each d by drawing $\theta_d = \{p(z|d)\}_{z \in [1,K]}$ and $\varphi_z = \{p(w|z)\}_{w \in V}$ from a Dirichlet distribution. In other words, when LDA generates each word in d, it first draws topic mixture $\theta_d$ in d according to Dirichlet distribution Dir($\alpha$), where $\alpha$ is a symmetric prior vector. Then, it chooses a topic z by the multinomial distribution $\theta_d$. Next, it chooses a word w from the multinomial distribution $\varphi_z$, which is drawn according to Dirichlet distribution Dir($\beta$), where $\beta$ is a symmetric prior vector.

The variables $\theta_d$ and $\varphi_z$ are estimated to fit the data as much as possible by approximation methods because exact estimation over all possible topic structure is infeasible. In approximation algorithms, the documents are used as clues to search among possible topic structures, and two methods are a variational method and a collapsed Gibbs sampling method. The collapsed Gibbs sampling method is selected for its simplicity and comparable performance to the variational method.

The role of the topic model is thus similar to that of the user reviews in that they both provide augmentation of vocabulary. In addition to bridging the vocabulary gap, the topic model can also remove noise in the user reviews. The key idea is to simultaneously model the app descriptions and the user reviews by sharing topics between the two different types of text and discarding parts of the user reviews if the parts of the user reviews don't have shared topics with the app descriptions. For example, when a user writes a review, the user may decide whether he or she writes about a topic in the app description or some other topics such as installation problems. The topics in the app descriptions are expected to be about app features. To remove the topics that are not about app features, two different topic clusters, including shared topics and review-only topics, may be built. The details are explained as follows.

| Algorithm 1 Generative Process of AppLDA |
| --- |
| for each shared topic z do |
|     draw $\phi_z \sim$ Dirichlet($\beta$) |
| end for |
| for each review topic y do |
|     draw $\omega_y \sim$ Dirichlet($\gamma$) |
| end for |
| for each app a with a description d and a review r do |
|     draw $\theta_d \sim$ Dirichlet($\alpha^d$) |
|     for each $i \in \{1,...,N_d\}$ do |
|         draw $z_{d,i} \sim$ Multi($\theta_d$) |
|         draw $w_{d,i} \sim$ Multi($\phi_{z_{d,i}}$) |
|     end for |
|     draw $\psi_r \sim$ Beta($\delta$) |
|     draw $\theta_r \sim$ Dirichlet(K • $\alpha^r$ • prior($\alpha^d, z_d$)) |
|     draw $\pi_r \sim$ Dirichlet($\tau$) |
|     for each $i \in \{1,...,N_r\}$ do |
|         draw $x_{r,i} \sim$ Bernoulli($\psi_r$) |
|         if $x_{r,i} = 0$ then |
|             draw $z_{r,i} \sim$ Multi($\theta_r$) |
|             draw $w_{r,i} \sim$ Multi($\phi_{z_{r,i}}$) |
|         else |
|             draw $y_{r,i} \sim$ Multi($\pi_r$) |
|             draw $w_{r,i} \sim$ Multi($\omega_{y_{r,i}}$) |
|         end if |
|     end for |
| end for |

Figure 6:
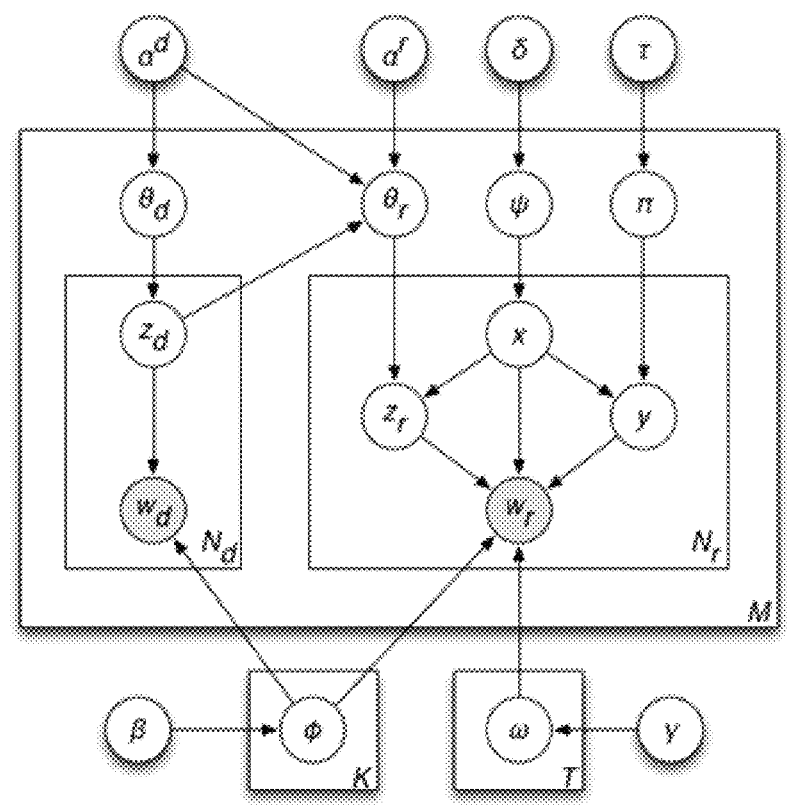
FIG. 6 illustrates an exemplary graphical representation of app latent dirichlet allocation (AppLDA) consistent with the disclosed embodiments.

FIG. 6 illustrates an exemplary graphical representation of app latent dirichlet allocation (AppLDA), and Algorithm 1 describes the generative process. As shown in FIG. 6 and Algorithm 1, the generation of the app description by an app developer is a typical process that is explained for regular LDA. After the app description is written, each word $w_{r,i}$ of review r with length $N_r$ for an app a is written by a user. The user first chooses whether to write about topics that are shared with descriptions or some other topics that are far from topics in the description using switch $x_{r,i}$ according to a Bernoulli distribution $\psi_a$, which is drawn from Beta distribution with a symmetric tuple $\delta$. If shared topics are chosen ($x_{r,i}=0$), the user specifies a topic $z_{r,i}$ from the topic distribution in r, $\theta_r$, which is drawn from a Dirichlet distribution with an asymmetric vector K·$\alpha^r$·prior($\alpha^d$, $z_d$), where K is the number of all shared topics; $\alpha^r$ is a symmetric vector. prior($\alpha^d$, $z_d$) is a prior distribution generated from the topics in the description d, $z_d$, and it is estimated by $$\frac{N_{z,d} + \alpha^d}{N_d + K\alpha^d},$$

where N with subscription and/or superscription means the number of words satisfying subscription/superscription conditions. For example, $N_{z,d}$ means the number of words assigned with z in d, and $N_d$ is the number of words in d. Then, the user writes a word $w_{r,i}$ about the chosen topic according to the multinomial word distribution $\varphi_z$, which is drawn from a Dirichlet distribution with a symmetric vector $\beta$. On the other hand, if the user chooses to write about topics that are far from description topics ($x_{r,i}=1$), the user chooses a review topic $y_{r,i}$ according to a multinomial topic distribution $\pi_r$, which is drawn from a symmetric vector $\tau$. Then, $w_{r,i}$ is chosen according to a word distribution $\omega_y$, which is drawn from a symmetric vector $\gamma$. This process is repeated for all words in all app descriptions and user reviews. It should be noted that all values in a symmetric vector are the same (e.g., $\alpha = \{\alpha, \ldots, \alpha\}$).

In order to guide the model to learn topics in the user reviews, prior knowledge from topic distributions in app descriptions may be used by prior($\alpha^d$, $z_d$). If an author writes a review about app features, the shared topics in the user reviews are likely to be similar to the topics in the app descriptions. For example, if an app is about finding nearby restaurants, the user reviews are more likely to contain topics about restaurants than other topics such as finance or weather topics. The prior knowledge in the app descriptions is passed to the user reviews in the form of asymmetric prior distribution, and this distribution is used to sample the shared topics in the user reviews. In other words, exploiting the prior knowledge in the app descriptions can be regarded as a summary of topics in the app descriptions, and the author writes a review referring to the summary.

The collapsed Gibbs sampling formulas to learn latent variables $z_d$, $z_r$, x, and y for app a are described as follows. Learning a topic of ith word in the app description d, $z_{d,i}$, is defined by:

$$p(z_{d,i} \mid W^d, Z^d_{\backslash d,i}, \alpha^d, \beta) \propto p(w_{d,i} \mid z_{d,i}, W^d_{\backslash d,i}, Z^d_{\backslash d,i}, \beta) p(z_{d,i} \mid Z^d_{\backslash d,i}, \alpha^d) \propto \quad (4)$$

$$\frac{N^{\backslash d,i}_{w_{d,i}\mid z_{d,i}} + \beta}{N^{\backslash d,i}_{z_{d,i}} + V\beta} \frac{N^{\backslash d,i}_{z_{d,i}\mid d} + \alpha^d}{N_d - 1 + K\alpha^d}$$

where $W^d$ is all the words in descriptions of all apps, $Z^d$ is all shared-topic assignments for those words in all descriptions; V is the size of vocabulary; K is the number of all shared topics; and N with subscription and/or superscription means the number of words satisfying subscription/superscription conditions; and "\d, i" excludes ith data of d. To learn a shared topic ($x_{r,i}=0$) for ith word in a user review r, $z_{r,i}$. The Gibbs sampling formula may be defined by:

$$p(x_{r,i} = 0, z_{r,i} \mid W^r, Z^r_{\backslash r,i}, Z^d, X_{\backslash r,i}, \alpha^r, \delta, \beta) \propto p(x_{r,i} = 0 \mid X_{\backslash r,i}, \delta) \times \quad (5)$$

$$p(w_{r,i} \mid z_{r,i}, W^r_{\backslash r,i}, Z^r_{\backslash r,i}, \beta) \times p(z_{r,i} \mid Z^r_{\backslash r,i}, Z^d, \alpha^r) \propto$$

$$\frac{N^{\backslash r,i}_{z=0\mid r} + \delta}{N_r - 1 + 2\delta} \frac{N^{\backslash r,i}_{w_{r,i}\mid z_{r,i}} + \beta}{N^{\backslash r,i}_{z_{r,i}} + V\beta} \frac{N^{\backslash r,i}_{z_{r,i}\mid r} + K\alpha^r \frac{N_{z_{r,i}\mid d} + \alpha^d}{N_d + K\alpha^d}}{\Sigma_z N^{\backslash r,i}_{z\mid r} + K\alpha^r}$$

where $W^r$ is all the words in the reviews of all apps, and $Z^r$ is all shared-topic assignments for those words in all reviews.

On the other hand, to learn a review-only topic ($x_{r,i}=1$) for the ith word in a user review r, $y_{r,i}$, the Gibbs sampling formula is defined by:

$$p(x_{r,i} = 1, y_{r,i} \mid W^r, Y_{\backslash r,i}, X_{\backslash r,i}, \tau, \delta, \gamma) \propto \quad (6)$$

$$p(x_{r,i} = 1 \mid X_{\backslash r,i}, \delta) \times p(w_{r,i} \mid y_{r,i}, W^r_{\backslash r,i}, Y_{\backslash r,i}, \gamma) \times p(y_{r,i} \mid Y_{\backslash r,i}, \tau) \propto$$

$$\frac{N^{\backslash r,i}_{z=1\mid r} + \delta}{N_r - 1 + 2\delta} \frac{N^{\backslash r,i}_{w_{r,i}\mid y_{r,i}} + \gamma}{N^{\backslash r,i}_{y_{r,i}} + V\gamma} \frac{N^{\backslash r,i}_{y_{r,i}\mid r} + \tau}{\Sigma_y N^{\backslash r,i}_{y\mid r} + T\tau}$$

where $Y^r$ is all review-topic assignments for words in all reviews, and T is the number of all review-only topics.

The sampling process is repeated for all words in descriptions and reviews for I iterations.

In order to retrieve apps relevant to the app search query q, document representations for apps need to be used. Therefore, the unigram language model for each app a, $p_{lda}(w|a)$, is created, which is defined by:

$$p_{lda}(w \mid a) = \sum_{z=1}^{K} p(w \mid z, W^d, \hat{Z}^d, \beta) p(z \mid a, \hat{Z}^d, \hat{Z}^r, \alpha^d, \alpha^r) \propto \qquad (7)$$

$$\sum_{z=1}^{K} \frac{\hat{N}_{w|z} + \beta}{\hat{N}_z + V\beta} \frac{\hat{N}_{z|d} + K\alpha^d + \hat{N}_{z|r} + K\alpha^r \frac{\hat{N}_{z|d} + \alpha^d}{N_d + K\alpha^d}}{N_d + K\alpha^d + \Sigma_z \hat{N}_{z|r} + K\alpha^r}$$

where α and β are symmetric prior vectors; w is a certain word in the app search query; $W^d$ is all the words in descriptions of all apps; K is a total number of all shared topics; $\hat{N}$ with subscription is an estimated number of words satisfying subscription condition; and $\hat{Z}^d$ and $\hat{Z}^r$ are topics for the app descriptions and the user reviews estimated from app latent dirichlet allocation (AppLDA), respectively.

The formula can be interpreted as the unification of LDA estimated language models for the app descriptions and the user reviews, where the words that are not assigned with the shared topics are removed. The app description and the cleaned user reviews form a single unified document for each app, and the unified language model is used for retrieval.

Returning to FIG. 5, after performing Step 530, based on the representation, the given query word is scored in each topic associated with each app, and then an app score for the given query is calculated from the scores of the query words (Step 540). This app score indicates the strength of association between a word and an app. For example, if a document is very likely to contain a topic (e.g., many words in an app description for Expedia are drawn from the "travel" topic), and that topic has a word that appears frequently, such as "hotel", then the app may be strongly associated with that word (e.g., an association score of "hotel" for Expedia is large).

The AppLDA estimated language model is linearly interpolated with the ML estimated language models to define the score function for q and a as follows:

$$\text{score}(q, a) = \prod_{w \in q} p(w \mid a) \qquad (8)$$

$$= \prod_{w \in q} (1 - \lambda) p_{lda}(w \mid a) + \lambda[(1 - \kappa) p_{ml}(w \mid a) + \kappa p(w \mid A)]$$

where $p_{ml}(w|a)$ is the ML estimated language model for a's description and cleaned review, which is defined as:

$$p_{ml}(w \mid a) = p(w \mid a, W^d, W^r, \hat{X}) \propto \frac{N_{w|d} + N_{x=0,w|r}}{N_d + N_{x=0|r}} \qquad (9)$$

and p(w|A) is estimated by the MLE for descriptions and cleaned reviews of all apps A, and it is defined as:

$$p(w \mid A) = p(w \mid A, W^d, W^r, \hat{X}) \propto \frac{N_{w|D} + N_{x=0,w|R}}{N_D + N_{x=0|R}} \qquad (10)$$

and κ is a smoothing parameter between the ML estimated language models, and λ is a parameter for smoothing the LDA estimated language model with the ML estimated language models.

In order to estimate stable values for LDA estimated language models, multiple Markov chains may be used. Optionally, three Markov chains are used in the LDA language model because three Markov chains with 100 Gibbs sampling iterations each show stable performance.

Further, a list of apps that are scored is ranked according to the relevance to the received app search query (Step 550). The score may indicate how closely each application matches a determined intent of the app search query. Based on the scores for the apps, a working subset of apps is selected from the initial set of apps. For example, apps that do not meet a threshold score may be discarded or removed.

For the same given query, an app with the largest query app score has the strongest relevance to the received app search. Therefore, the app with the largest query app score is ranked first place in the ranked app list. An app with the smallest query app score has the weakest relevance to the received app search. Therefore, the app with the smallest query app score is ranked last place in the ranked app list.

Finally, the ranked app list is provided for the user (Step 560). The user may set the number of apps in the outputted ranked app list. For example, a user may set 50 apps in the ranked app list. This ranked app list may be formatted to be viewable by the mobile device used by the user. Specifically, this ranked app list may be formatted and provided to a user's device so that a user can view and browse the ranked app list. Selection of any of the apps on the ranked app list by the user results in the user being brought to an app launch page associated with that app.

The method for unifying document representations of the app descriptions and the user reviews is provided in order to leverage the user reviews for app search. The topic-based model may find shared topics in the app descriptions and the user reviews, as well as review-only topics in the user reviews. After removing the review-only topics in the user reviews, unigram language models of the app descriptions and the cleaned user reviews may be unified in order to create desired representations of apps. Further, the proposed topic model can be applied to any text data about an entity with associated noisy text data.

The disclosed systems and methods can also be applied to other devices with displays, such as smart phones, tablets, smart watches, and so on. That is, the disclosed methods not only can be used for app retrieval systems, but also can be applied as the core function for other systems, such as social media systems, other content recommendation systems, information retrieval systems, or any user interactive systems, and so on.

Figure 7:
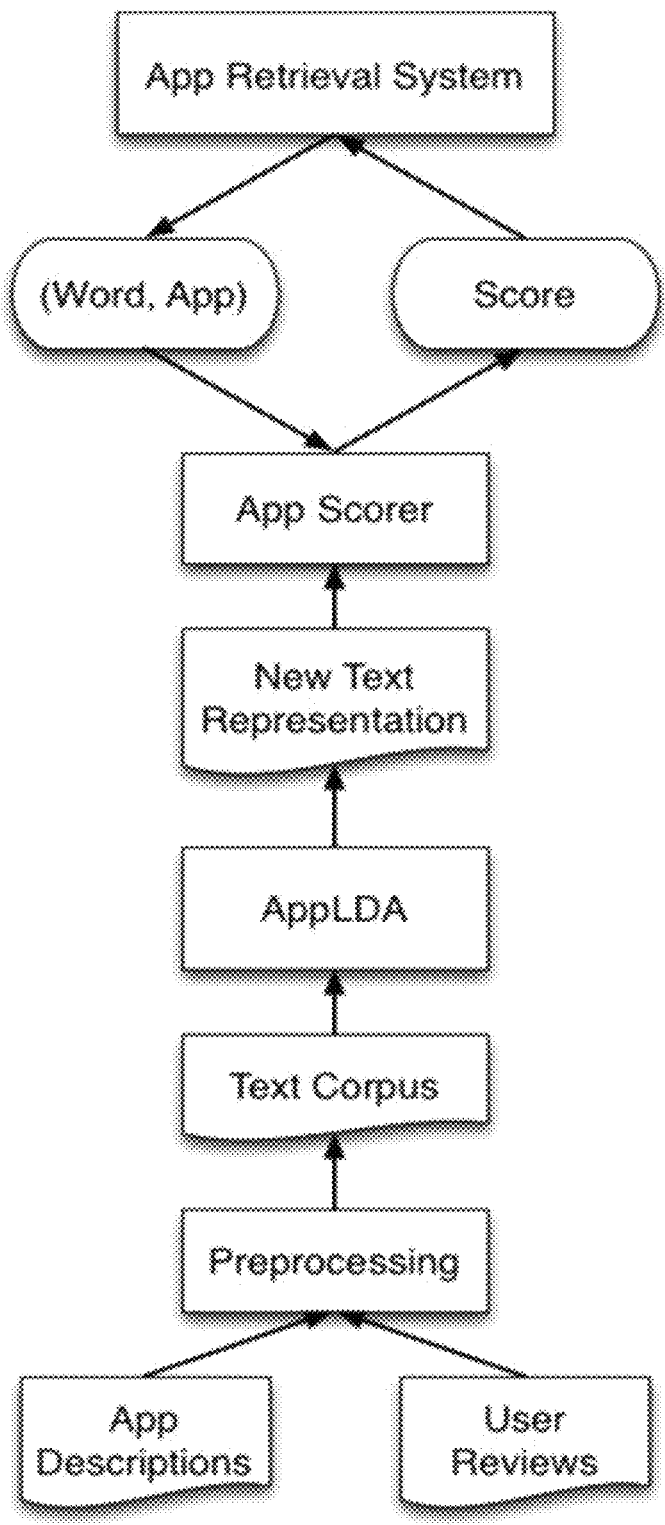
FIG. 7 illustrates a flow chart of an exemplary process for app retrieval consistent with the disclosed embodiments.

FIG. 7 illustrates a flow chart of an exemplary process for app retrieval consistent with the disclosed embodiments. As shown in FIG. 7, a user wants to rent an apartment. At the beginning, the user inputs a search query "1 bedroom rent" on an app search bar in a browser installed in his/her mobile phone. After an app retrieval system receives the app search query (i.e., "1 bedroom rent") inputted by the user, based on the received app search query, the app retrieval system extracts app descriptions and user reviews of relevant apps from an app database. The app retrieval system preprocesses the extracted app descriptions and user reviews of each app to generate a text corpus. The app retrieval system creates a topic-based language model (AppLDA) for combining representations of the app description and a merged user review to generated new text representations. That is, the app description and the merged user review can be applied to train the topic-based language model to retrieval what the user is looking for. Further, the app retrieval system may score the given query word in each topic associated with each app. If a document is very likely to contain a topic (e.g., many words in app Trulia's description are drawn from a "home for rent" topic), and the "home for rent" topic has a word "bedroom" that appears frequently, then the app Trulia is strongly associated with that word (e.g., an association score of "bedroom" for the app Trulia is large). Similarly, the "home for rent" topic has words "rent" that appears frequently. Then, an app scorer may calculate each app score for the given query from the scores of the query words ("bedroom" and "rent").

A list of apps (e.g., Trulia, Zillow, Hotpads, and Craigslist) that are scored is ranked according to the relevance to the received app search query. Finally, the ranked app list that the user is most likely interested in by implementing the model is provided for the user. App Trulia on the ranked app list selected by the user results in the user being brought to an app launch page associated with app Trulia. Or the user may also input another searching query to the app retrieval system in order to start another app searching operation.

The disclosed methods and systems can leverage the user reviews to find out important features of apps and bridge vocabulary gap between the app developers and the users. Specifically, the disclosed methods and systems may combine the app descriptions and the user reviews using the topic-based language model in order to generate app representations while excluding noises in the user reviews. The topic-based language model is unsupervised and general so that it can be applied to other domains where there are unstructured text about an entity and an associated set of unstructured text. For example, app retrieval systems may be integrated in smart phones to help organize and share information valuable to assist in booking a flight, reserving a restaurant, researching a doctor, choosing movies, choosing services and shops, renting DVDs, buying books, etc.

Other steps may be referred to above descriptions with respect to the app retrieval system. Other applications, advantages, alternations, modifications, or equivalents to the disclosed embodiments are obvious to those skilled in the art.

What is claimed is:

1. A method for an app search engine leveraging user reviews, comprising:
receiving an app search query from a user;
based on the received app search query, determining a plurality of relevant apps;
extracting app descriptions and user reviews associated with the plurality of relevant apps from an app database;
preprocessing the extracted app descriptions and user reviews of each of the plurality of relevant apps to generate a text corpus;
based on the generated text corpus, creating a topic-based language model for each of the plurality of relevant apps, wherein the topic-based language model combines the app descriptions and the user reviews;
ranking a list of relevant apps using the topic-based language model, comprising:
removing noises in the user reviews;
scoring each given query word g in each topic associated with each of the plurality of relevant apps a;
calculating an app score for the app search query from scores of the query words, wherein a score function for q and a is defined as:

$$\text{score}(q, a) = \prod_{w \in q} p(w \mid a)$$

$$= \prod_{w \in q} [(1-\mu)p(w \mid d) + \mu p(w \mid r)]$$

$$= \prod_{w \in q} [(1-\mu)((1-\kappa_d)p_{ml}(w \mid d) + \kappa_d p(w \mid D)) +$$

$$\mu((1-\kappa_r)p_{ml}(w \mid r) + \kappa_r p(w \mid R))]$$

where D is a document corpus, and pml(w|d) and p(w|D) are estimated by a Maximum Likelihood Estimator (MLE), which makes $$p_{ml}(w \mid d) = \frac{c(w, d)}{\sum_{w'} c(w', d)} \text{ and } p(w \mid D) = \frac{c(w, D)}{\sum_{w'} c(w', D)},$$

p(w|R) is a background language model in all reviews R, and $K_d$ and $K_r$ are smoothing parameters for app descriptions and user reviews; and
ranking the list of relevant apps that are scored according to relevance to the received app search query, wherein a language model for an app a is created by linearly interpolating a unigram language model for the app descriptions d and the user reviews r, which is defined by:

$p(w|a)=(1-\mu)p(w|d)+\mu p(w|r)$, wherein w is a certain word in the app search query; and $\mu$ is a parameter to determine a proportion of a review language model in p(w|a);
retrieving, based on the unigram language model, the list of relevant apps by
the certain word not contained in the app descriptions or the user reviews; and providing the ranked app list for the user.

2. The method according to claim 1, wherein providing the ranked app list for the user further includes:
formatting the ranked app list to be viewable by a mobile device used by the user.

3. The method according to claim 1, wherein preprocessing the extracted app descriptions and user reviews of each of the plurality of relevant apps to generate a text corpus further includes:
normalizing content of the text corpus to a canonical form.

4. The method according to claim 1, wherein:
the app score indicates strength of association between the query words and the app.

5. The method according to claim 1, wherein:
provided that each document d contains $N_d$ words and a whole document collections build a word vocabulary V, the topic-based language model for each app a in each topic z is defined by:

$$p_{lda}(w \mid a) = \sum_{z=1}^{K} p(w \mid z, W^d, \hat{Z}^d, \beta) p(z \mid a, \hat{Z}^d, \hat{Z}^r, \alpha^d, \alpha^r) \propto$$

$$\sum_{z=1}^{K} \frac{\hat{N}_{w \mid z} + \beta}{\hat{N}_z + V\beta} \frac{\hat{N}_{z \mid d} + K\alpha^d + \hat{N}_{z \mid r} + K\alpha^r \frac{\hat{N}_{z \mid d} + \alpha^d}{N_d + K\alpha^d}}{N_d + K\alpha^d + \Sigma_z \hat{N}_{z \mid r} + K\alpha^r}$$

wherein α and β are symmetric prior vectors; w is a certain word in the app search query; $W^d$ is all the words in descriptions of all apps; K is a total number of all shared topics; $\hat{N}$with subscription is an estimated number of words satisfying subscription condition; and $\hat{Z}^d$ and $\hat{Z}^r$ are topics for the app descriptions and the user reviews estimated from app latent dirichlet allocation (AppLDA), respectively.

6. A system for an app search engine leveraging user reviews, comprising:
a memory;
a processor coupled to the memory;
a plurality of program units stored in the memory to be executed by the processor, the plurality of program units comprising:
  a receiving module configured to receive an app search query from a user;
  an extraction module configured to determine a plurality of relevant apps based on the received app search query and extract app descriptions and user reviews associated with the plurality of relevant apps from an app database;
  a preprocessing module configured to perform preliminary processing for the extracted app descriptions and user reviews of each of the plurality of relevant apps to generate a text corpus;
  a language model creating module configured to, based on the generated text corpus, create a topic-based language model for each of the plurality of relevant apps, wherein the topic-based language model combines the app descriptions and the user reviews;
  a result ranking module configured to rank a list of relevant apps using the topic-based language model and provide the ranked app list to the user; and
  an app scorer configured to score the given query word g in each topic associated with each app, and calculate each app score for the given query from the scores of the query words, wherein a language model for an app a is created by linearly interpolating a unigram language model for the app descriptions d and the user reviews r, which is defined by:

$p(w|a) = (1-\mu)p(w|d) + \mu p(w|r)$ wherein w is a certain word in the app search query; and μ is a parameter to determine a proportion of a review language model in p(w|a), and the list of relevant apps is retrieved by the certain word not contained in the app descriptions or the user reviews based on the unigram language model; and
a score function for g and a is defined as:

$$\text{score}(q, a) = \prod_{w \in q} p(w|a)$$

-continued $$= \prod_{w \in q} [(1-\mu)p(w|d) + \mu p(w|r)]$$

$$= \prod_{w \in q} [(1-\mu)((1-\kappa_d)p_{ml}(w|d) + \kappa_d p(w|D)) + \mu((1-\kappa_r)p_{ml}(w|r) + \kappa_r p(w|R))]$$

wherein D is a document corpus, and pml(w|d) and p(w|D) are estimated by a Maximum Likelihood Estimator (MLE), which makes $$p_{ml}(w|d) = \frac{c(w,d)}{\sum_{w'} c(w',d)} \text{ and } p(w|D) = \frac{c(w,D)}{\sum_{w'} c(w',D)},$$

p(w|R) is a background language model in all reviews R, and $K_d$ and $K_r$ are smoothing parameters for app descriptions and user reviews.

7. The system according to claim 6, wherein:
the ranked app list is formatted to be viewable by a mobile device used by the user.

8. The system according to claim 6, wherein:
the preprocessing module is further configured to normalize content of the text corpus to a canonical form.

9. The system according to claim 6, wherein:
the app score indicates strength of association between the query words and the app.

10. The system according to claim 6, wherein:
provided that each document d contains Nwords and a whole document collections build a word vocabulary V, the topic-based language model for each app a in each topic z is defined by:

$$p_{lda}(w|a) = \sum_{z=1}^{K} p(w|z, W^d, \hat{Z}^d, \beta) p(z|a, \hat{Z}^d, \hat{Z}^r, \alpha^d, \alpha^r) \propto$$

$$\sum_{z=1}^{K} \frac{\hat{N}_{w|z} + \beta}{\hat{N}_z + V\beta} \frac{\hat{N}_{z|d} + K\alpha^d + \hat{N}_{z|r} + K\alpha^r \frac{\hat{N}_{z|d} + \alpha^d}{N_d + K\alpha^d}}{N_d + K\alpha^d + \Sigma_z \hat{N}_{z|r} + K\alpha^r}$$

wherein α and β are symmetric prior vectors; w is a certain word in the app search query; $W^d$ is all the words in descriptions of all apps; K is a total number of all shared topics; $\hat{N}$with subscription is an estimated number of words satisfying subscription condition; and $\hat{Z}^d$ and $\hat{Z}^r$ are topics for the app descriptions and the user reviews estimated from app latent dirichlet allocation (AppLDA), respectively.

* * * * *